United States Patent
Stoicescu

(10) Patent No.: US 11,934,617 B1
(45) Date of Patent: Mar. 19, 2024

(54) ULTRASONIC TOUCH SENSOR USING CAPACITIVE CROSS-TALK

(71) Applicant: Infineon Technologies AG, Neubiberg (DE)

(72) Inventor: Emanuel Stoicescu, Bucharest (RO)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 18/054,276

(22) Filed: Nov. 10, 2022

(51) Int. Cl.
G06F 3/043 (2006.01)
G06F 3/041 (2006.01)
G06F 3/044 (2006.01)

(52) U.S. Cl.
CPC .......... G06F 3/0436 (2013.01); G06F 3/0418 (2013.01); G06F 3/044 (2013.01); G06F 2203/04106 (2013.01)

(58) Field of Classification Search
CPC ............................................... G06F 3/041–047
See application file for complete search history.

(56) References Cited

U.S. PATENT DOCUMENTS

| 7,856,883 | B2 * | 12/2010 | Chang | G06F 3/043 |
| | | | | 73/598 |
| 9,990,089 | B2 * | 6/2018 | Dickinson | G01S 15/02 |
| 10,235,552 | B2 * | 3/2019 | D'Souza | G06F 21/32 |
| 11,231,816 | B2 * | 1/2022 | Khajeh | G06F 3/0436 |
| 11,698,701 | B1 * | 7/2023 | Stoicescu | G06F 3/0436 |
| | | | | 345/177 |
| 2009/0235750 | A1 * | 9/2009 | Chang | G06F 3/043 |
| | | | | 73/627 |
| 2018/0101711 | A1 * | 4/2018 | D'Souza | G06V 40/1306 |
| 2018/0373393 | A1 * | 12/2018 | Lerner | G06F 3/0488 |
| 2018/0373913 | A1 * | 12/2018 | Panchawagh | H10K 59/65 |
| 2021/0405809 | A1 * | 12/2021 | Khajeh | G06F 3/04182 |
| 2023/0062377 | A1 * | 3/2023 | Steiner | G06F 3/03547 |
| 2023/0152448 | A1 * | 5/2023 | Elian | G06F 3/043 |
| | | | | 345/177 |

FOREIGN PATENT DOCUMENTS

| CN | 107334461 A | 11/2017 |
| WO | 2021/093384 A1 | 5/2021 |

* cited by examiner

Primary Examiner — Patrick F Marinelli
(74) Attorney, Agent, or Firm — Harrity & Harrity, LLP

(57) ABSTRACT

A touch sensor includes a touch structure; a signal generator configured to generate an excitation signal; a transmitter configured to receive the excitation signal and transmit an ultrasonic transmit wave towards the touch structure based on the excitation signal; a receiver configured to receive an ultrasonic reflected wave produced by a reflection of the ultrasonic transmit wave at the touch structure, wherein the transmitter and the receiver are coupled by a capacitive path, the receiver is configured to be influenced by the excitation signal whereby the excitation signal induces a capacitive cross-talk on the capacitive path, and the receiver is configured to generate a measurement signal representative of the capacitive cross-talk; and a measurement circuit coupled to the receiver and configured to perform a comparison of the measurement signal with a threshold to determine whether a no-touch event or a touch event has occurred at the touch interface.

22 Claims, 5 Drawing Sheets

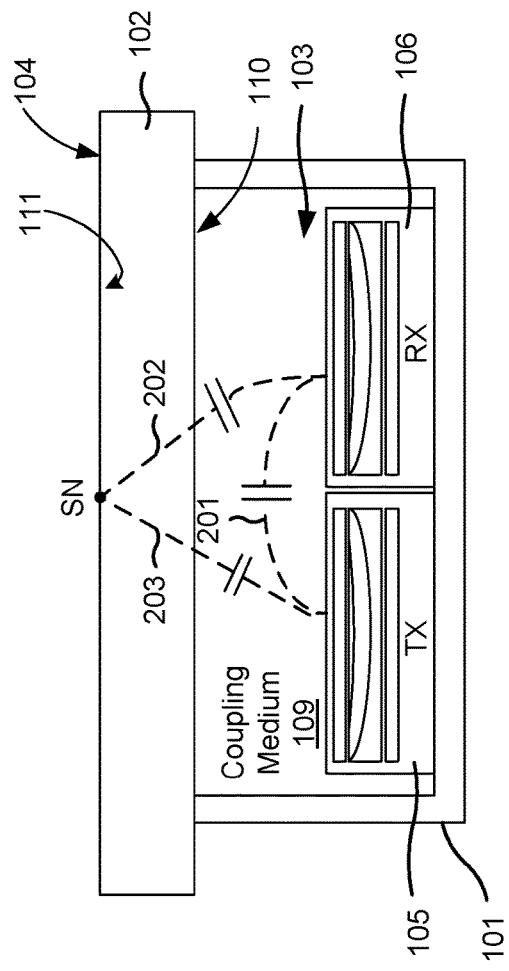
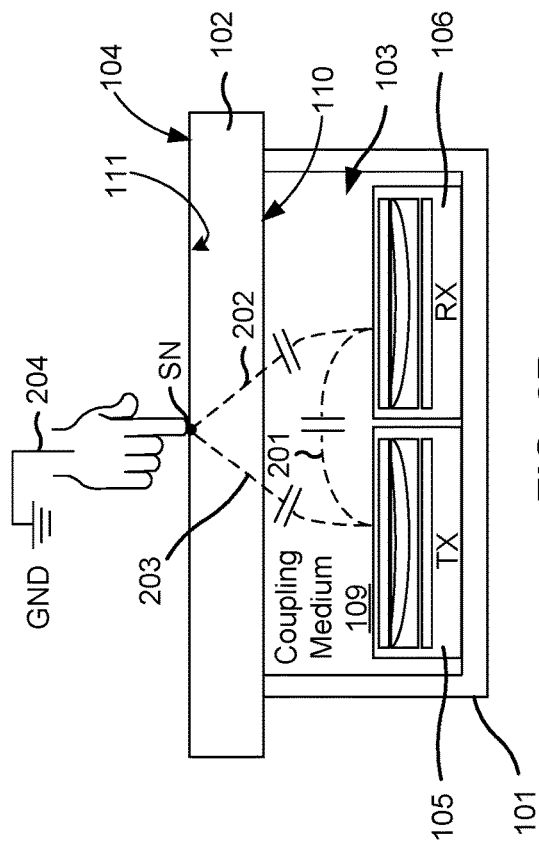

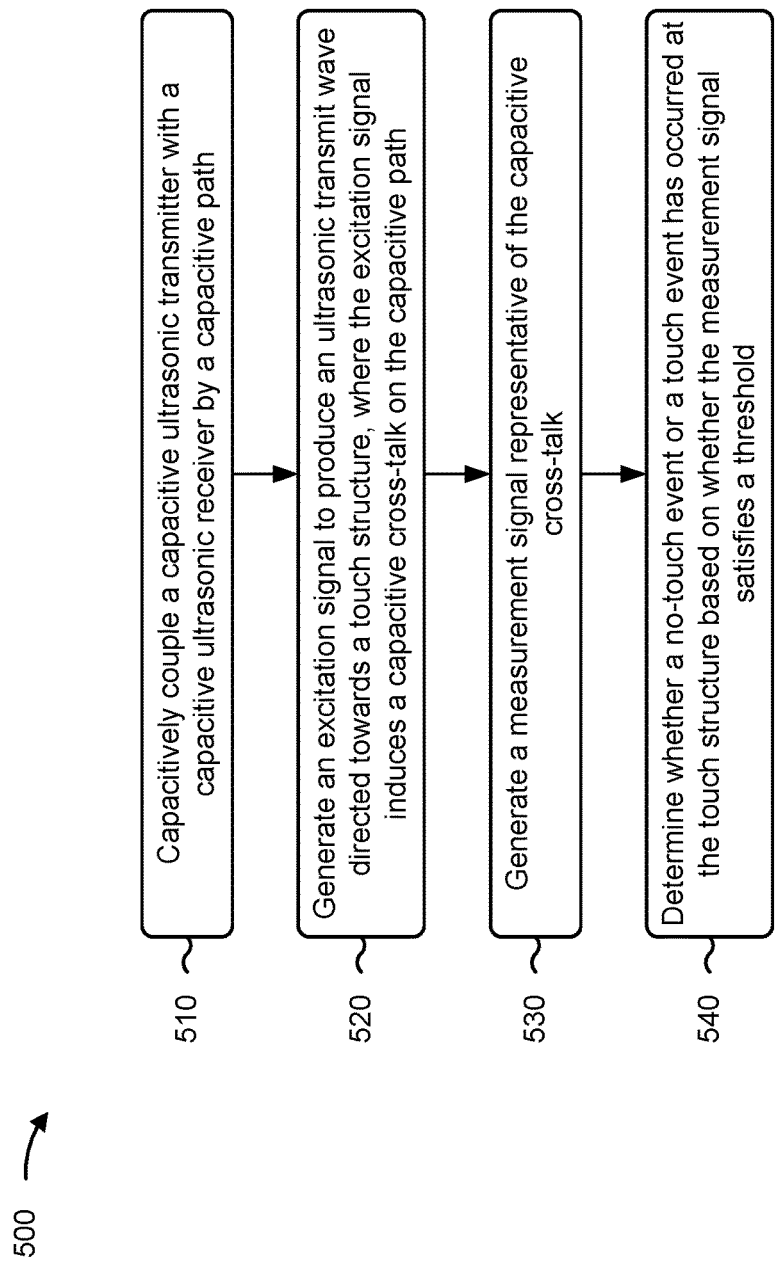

ULTRASONIC TOUCH SENSOR USING CAPACITIVE CROSS-TALK

BACKGROUND

Touch sensing through metal surfaces using ultrasound waves is currently being investigated as an alternative to capacitive touch sensing principles. Ultrasonic sensing relies on a transmission of an ultrasound wave directed at a touch structure and a reception and processing of a reflected waveform that is reflected back from the touch structure. A characteristic of the reflected waveform will depend on an existence or a non-existence of a touch event that can be used to discriminate between the existence or the non-existence of the touch event.

SUMMARY

In some implementations, a touch sensor includes a housing having an ultrasound chamber; a touch structure coupled to the housing and arranged over the ultrasound chamber, wherein the touch structure comprises a touch interface; a signal generator configured to generate an excitation signal for producing an ultrasonic transmit wave; a transmitter arranged within the ultrasound chamber, wherein the transmitter is configured to receive the excitation signal and transmit the ultrasonic transmit wave towards the touch structure based on the excitation signal; a receiver arranged within the ultrasound chamber, wherein the receiver is configured to receive an ultrasonic reflected wave produced by a reflection of the ultrasonic transmit wave at the touch structure, wherein the transmitter and the receiver are coupled by a capacitive path, wherein the receiver is configured to be influenced by the excitation signal whereby the excitation signal induces a capacitive cross-talk on the capacitive path, and wherein the receiver is configured to generate a measurement signal representative of the capacitive cross-talk; and a measurement circuit coupled to the receiver and configured to perform a comparison of the measurement signal with a threshold and determine whether a no-touch event or a touch event has occurred at the touch interface based on whether the measurement signal satisfies the threshold.

In some implementations, a touch sensor includes a housing comprising a frame and a touch structure coupled to the frame to define an ultrasound chamber; a signal generator configured to generate an excitation signal for producing an ultrasonic transmit wave; a capacitive ultrasonic transmitter arranged inside the ultrasound chamber, wherein the capacitive ultrasonic transmitter is configured to receive the excitation signal and transmit the ultrasonic transmit wave towards the touch structure based on the excitation signal; a capacitive ultrasonic receiver arranged inside the ultrasound chamber, wherein the capacitive ultrasonic transmitter and the capacitive ultrasonic receiver are coupled by a capacitive path, wherein the capacitive ultrasonic receiver is configured to be influenced by the excitation signal whereby the excitation signal induces a capacitive cross-talk on the capacitive path, and wherein the capacitive ultrasonic receiver is configured to generate a measurement signal representative of the capacitive cross-talk; and a measurement circuit coupled to the capacitive ultrasonic receiver to receive the measurement signal, wherein the measurement circuit is configured to determine whether a no-touch event or a touch event has occurred at the touch structure based on whether the measurement signal satisfies a threshold.

In some implementations, a method includes capacitively coupling a capacitive ultrasonic transmitter with a capacitive ultrasonic receiver by a capacitive path; generating an excitation signal to produce an ultrasonic transmit wave directed towards a touch structure, where the excitation signal induces a capacitive cross-talk on the capacitive path; generating a measurement signal representative of the capacitive cross-talk; and determining whether a no-touch event or a touch event has occurred at the touch structure based on whether the measurement signal satisfies a threshold.

BRIEF DESCRIPTION OF THE DRAWINGS

Implementations are described herein making reference to the appended drawings.

FIGS. 2A and 2B illustrate an ultrasonic touch sensor according to one or more implementations.

FIG. 5 illustrates a flowchart of an example process associated with ultrasonic touch sensor using capacitive cross-talk for making a touch/no-touch decision.

DETAILED DESCRIPTION

Figure 1:
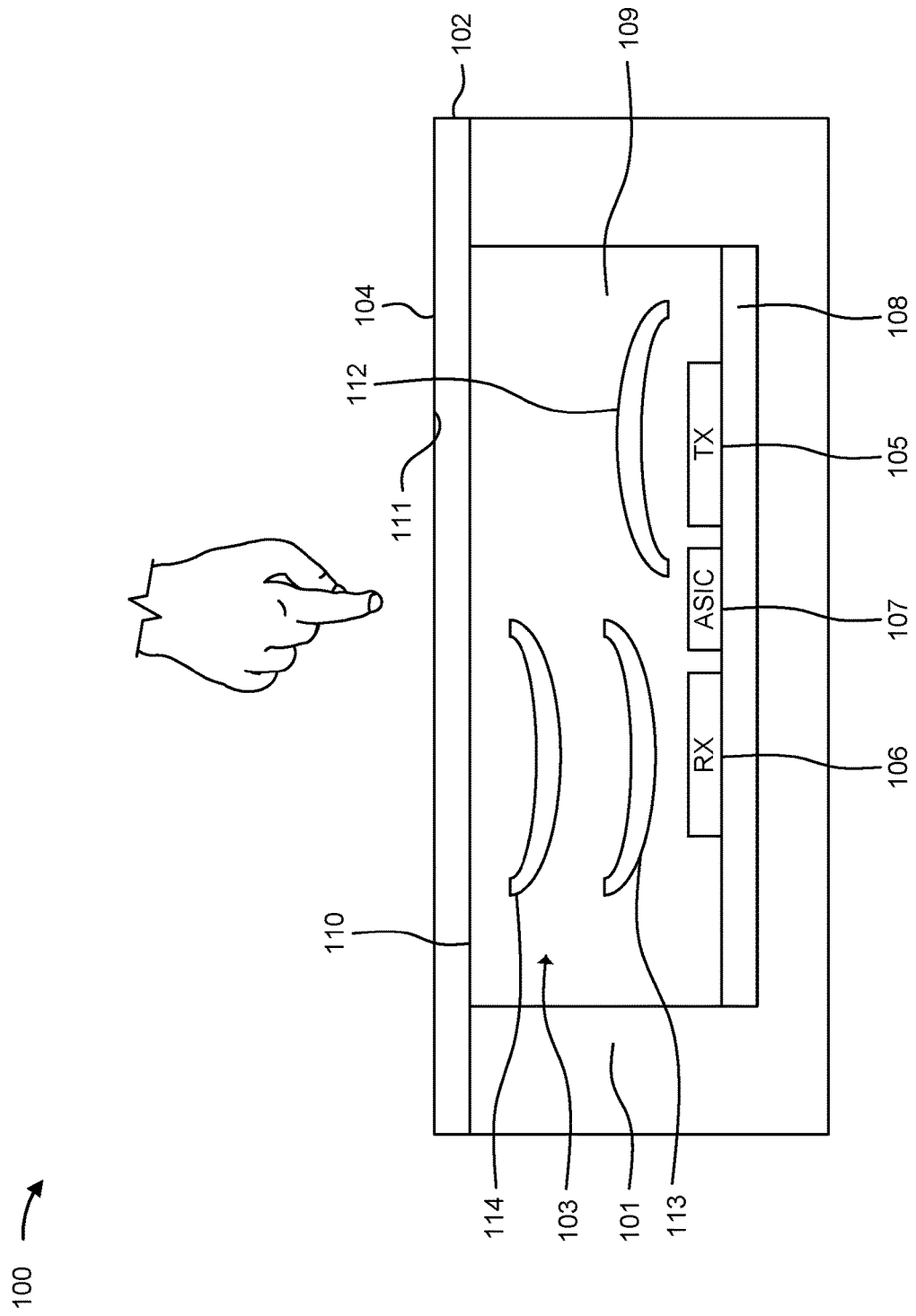
FIG. 1 illustrates an ultrasonic touch sensor according to one or more implementations.

In the following, details are set forth to provide a more thorough explanation of example implementations. However, it will be apparent to those skilled in the art that these implementations may be practiced without these specific details. In other instances, well-known structures and devices are shown in block diagram form or in a schematic view rather than in detail in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top," "bottom," "below," "above," "front," "behind," "back," "leading," "trailing," etc., may be used with reference to an orientation of the figures being described. Because parts of the implementations, described herein, can be positioned in a number of different orientations, the directional terminology is used for purposes of illustration and is in no way limiting. It is to be understood that other implementations may be utilized and structural or logical changes may be made without departing from the scope defined by the claims. The following detailed description, therefore, is not to be taken in a limiting sense.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling, e.g., any connection or coupling without additional intervening elements, may also be implemented by an indirect connection or coupling, e.g., a connection or coupling with one or more additional intervening elements, or vice versa, as long as the general purpose of the connection or coupling, for example, to transmit a certain kind of signal or to transmit a certain kind of information, is essentially maintained. Features from different implementations may be combined to form further implementations. For example, variations or modifications described with respect to one of the implementations may also be applicable to other implementations unless noted to the contrary.

The terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of that approximate resistance value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

A sensor may refer to a component which converts a property to be measured to an electrical signal, for example, a current signal or a voltage signal. For an ultrasonic touch sensor, the property is an ultrasound wave produced, for example, by a microelectromechanical system (MEMS) transducer. The ultrasound wave is directed at a touch structure where the ultrasound wave is reflected back by the touch structure as a reflected ultrasound wave. The reflected ultrasound wave can be used for sensing touch (e.g., a touch event) through metal surfaces. Specifically, the ultrasonic touch sensor can use the reflected ultrasound wave to discriminate between an existence of the touch event or a non-existence of the touch event (e.g., a no-touch event). However, an issue arises when a user is wearing a glove, which does not allow energy of a transmitted ultrasound wave to be absorbed adequately for the ultrasonic touch sensor to detect the touch made by the user. Accordingly, the touch made with while wearing the glove may not be detected and may be misinterpreted by the ultrasonic touch sensor as the no-touch event.

Some implementations disclosed herein are directed to using capacitive cross-talk for sensing a touch force that occurs during any type of touch event, including a touch event involving a user wearing a glove. A transmitter and a receiver of an ultrasonic touch sensor are capacitively coupled by a first capacitive path that can be influenced by an excitation signal that is used to excite or drive the transmitter to produce an ultrasonic transmit wave. As a result of the capacitive coupling, capacitive cross-talk between the transmitter and the receiver occurs when the excitation signal is provided to the transmitter. In other words, the excitation signal induces the capacitive cross-talk on the first capacitive path. While the ultrasound wave is initially transmitted by the transmitter, and prior to any reflected ultrasound waves being received by the receiver, the receiver is influenced by the excitation signal through the capacitive coupling and produces an electrical signal that is representative of the capacitive cross-talk.

A touch event forms a second capacitive path with the transmitter. The second capacitive path is formed from the transmitter, through a user, to ground (e.g., from the transmitter, through a touch structure, through a body of the user, to the ground). As a result of the second capacitive path being formed during the touch event, the capacitive cross-talk between the transmitter and the receiver is reduced. Because the capacitive cross-talk occurs during a predefined time interval, prior to any reflected ultrasound waves being received by the receiver, the capacitive cross-talk can be monitored and used for detecting the touch event. For example, a measured reduction in the capacitive cross-talk can be detected by the ultrasonic touch sensor during the predefined time interval and used to detect the touch event.

Moreover, the second capacitive path is formed even in instances involving indirect touches, such as touches during which the user's skin does not make direct contact with the touch structure (e.g., while the user is wearing a glove). Therefore, by incorporating measurements of the capacitive cross-talk into the ultrasonic touch sensor, the ultrasonic touch sensor can appropriately discriminate between touch events and no-touch events, including touch events from indirect touch such as those involving the user wearing a glove. Not only can the ultrasonic touch sensor detect direct touches and indirect touches using the measurements of the capacitive cross-talk, but the measurements of the capacitive cross-talk can help to ensure that indirect touches are not misinterpreted by the ultrasonic touch sensor as no-touch events (e.g., as no-touches), thereby improving accuracy and reliability of touch/no-touch decisions made by the ultrasonic touch sensor.

FIG. 1 illustrates an ultrasonic touch sensor 100 according to one or more implementations. The ultrasonic touch sensor 100 includes a housing comprising a frame 101 and a touch structure 102 (e.g., a touch substrate) that form an ultrasound chamber 103. The frame 101 may be made of an encapsulant, such as overmolded thermoplastic or another type of molding material. As part of the housing, the frame 101 may have a recess that becomes the ultrasound chamber 103 when the touch structure 102 encloses the recess. In some implementations, part of the frame 101 may extend into and fill the ultrasound chamber 103, thereby covering one or more sensor components arranged therein. Epoxy or some other ultrasound-compatible material casted in the recess may be used. Accordingly, an area of the housing in which ultrasonic transducers reside may be referred to as an acoustic port, an ultrasound port, an acoustic chamber, or an ultrasound chamber, among other examples.

In either case, the touch structure 102 is used as a lid or a package cover that rests upon a touch side of the ultrasonic touch sensor 100. In the example shown, the ultrasound chamber 103 is a chamber that is formed by the enclosure of the frame 101 and the touch structure 102. The touch structure 102 may be made of one or more metal layers, one or more plastic layers, and/or one or more layers made out of another solid material. The touch structure 102 includes a touch surface 104 at its external interface with an environment. The touch surface 104 is arranged and operable to receive contact (e.g., touches) from a user that can be detected by sensor circuitry.

In some implementations, lateral sides of the frame 101 may be at least partially open such that the ultrasound chamber 103 is not a fully enclosed volume. For example, the lateral sides the frame 101 may include columns that support the touch structure 102 and/or the touch structure 102 may be supported by a coupling medium. For example, the coupling medium, such as a film layer, a silicone gel, or a soft epoxy, may be provided in the ultrasound chamber 103 and may be mechanically coupled to and between a circuit substrate at a bottom side of the ultrasound chamber 103 and the touch structure 102 at a top side of the ultrasound chamber 103 to provide support to the touch structure 102. In some implementations, the lateral sides of the ultrasound chamber 103 may be fully open, with the lateral sides of the frame 101 being absent, and the touch structure 102 may be partially or fully supported by the coupling medium. Thus, the coupling medium may be sufficiently rigid to support the touch structure 102 in cases which the lateral sides of the ultrasound chamber 103 are fully open.

The ultrasound chamber 103 contains the sensor circuitry used for detecting the no-touch events and the touch events at the touch surface 104. A touch event is defined as an instance when the user makes contact with the touch surface 104 and a no-touch event is all other circumstances, including the occurrence of disturbing influences (i.e., error sources) that may occur in the absence of the touch event. The sensor circuitry is configured to distinguish between the touch event and the no-touch event, taking into account possible errors originating from the disturbing influences.

As defined herein, an ultrasound wave is a sound wave having a frequency of 20 kHz or higher. An ultrasound wave may be referred to as an ultrasonic transmit wave when the ultrasound wave is transmitted by a transmitter and may be referred to as an ultrasonic reflected wave when the ultrasound wave has been reflected by the touch structure 102 for reception at a receiver. The sensor circuitry includes a transmitter (TX) 105 configured to transmit ultrasound waves (e.g., ultrasonic transmit waves), a receiver (RX) 106 configured to receive reflected ultrasound waves (e.g., ultrasonic reflected waves), and a sensor circuit 107 (e.g., an application specific integrated circuit (ASIC)). The sensor circuit 107 may be configured to generate the ultrasound waves for transmission by the transmitter 105, and perform signal processing on the reflected ultrasound waves received by the receiver 106. In some implementations, the sensor circuit 107 may be configured to evaluate the reflected ultrasound waves for detecting no-touch events and touch events by applying a first touch detection algorithm, and control one or more components of the ultrasonic touch sensor 100, including control of the transmitter 105, the receiver 106, or any signal processing components of a signal processing chain of the sensor circuit 107. In some implementations, the sensor circuit 107 may evaluate an additional property of the ultrasonic touch sensor 100 (e.g., an internal pressure, bias voltage, or a cross-coupling effect) from which a measurement signal is obtained and evaluated for detecting the no-touch events and the touch events by applying a second touch detection algorithm. In some implementations, both the first touch detection algorithm and the second touch detection algorithm may be used in combination for detecting the no-touch events and the touch events.

The transmitter 105 and the receiver 106 may both be sound transducers with a flexible membrane that vibrates to either produce sound waves, in the case of the transmitter 105, or in response to receiving sound waves, in the case of the receiver 106. In particular, the transmitter 105 and the receiver 106 may be capacitive micromachined ultrasonic transducer (CMUTs). In some implementations, the transmitter 105 and the receiver 106 may be combined into a single transceiver transducer that has a single flexible membrane.

A CMUT is a MEMS transducer where an energy transduction is due to a change in capacitance. CMUTs are constructed on silicon using micromachining techniques. A cavity may be formed in a silicon substrate, which serves as a first electrode of a capacitor. A thin layer suspended on a top of the cavity serves as the flexible membrane on which a conductive layer acts a second electrode of the capacitor. The first electrode and the second electrode of the capacitor are biased with a bias voltage (e.g., a DC bias voltage) that establishes an initial operating condition of the MEMS transducer. Accordingly, the first electrode and the second electrode of the capacitor may be referred to as biased electrodes.

When an AC signal is applied across the biased electrodes of the capacitor, the AC signal is superimposed onto the bias voltage. As a result, the flexible membrane will vibrate and produce ultrasound waves in a medium of interest. In this way, the CMUT works as a transmitter. The sensor circuit 107 is configured to generate an excitation signal and transmit the excitation signal to the transmitter 105. The excitation signal is applied across the biased electrodes, causing the flexible membrane to vibrate according to the waveform of the excitation signal and producing a corresponding ultrasound wave. Different excitation signals induce different ultrasound waves. Accordingly, the excitation signal is a signal applied to the transmitter 105 by the sensor circuit 107 to produce an ultrasound wave that is used to detect touch events at the touch surface 104 of the touch structure 102 as well as the applied force thereof. Thus, the sensor circuit 107 may include a signal generator that is configured to generate an excitation signal for producing an ultrasonic wave. The transmitter 105 is configured to receive the excitation signal from the signal generator and transmit the ultrasonic wave based on the excitation signal.

On the other hand, when an ultrasound wave is applied to (e.g., received by) the flexible membrane of a biased CMUT, the flexible membrane will vibrate according to the applied ultrasound wave and the CMUT will generate an alternating signal (e.g., a measurement signal) as the capacitance is varied. In this way, the alternating signal is a measurement signal representative of received ultrasound waves and the CMUT operates as a receiver of the ultrasound waves. It is also possible that each MEMS transducer is configurable as a transceiver that is capable of both transmitting and receiving ultrasound waves.

The transmitter 105, the receiver 106, and the sensor circuit 107 may be arranged on a common circuit substrate 108 (e.g., a printed circuit board (PCB)) that is disposed at a base of the frame 101. The common circuit substrate 108 is configured to electrically couple the sensor circuit 107 to both the transmitter 105 and the receiver 106. The transmitter 105, the receiver 106, and the sensor circuit 107 may be separate integrated circuits (ICs) (e.g., dies) or may be combined in any combination into one or two ICs. Additionally, both the transmitter 105 and the receiver 106 may be implemented as separate transceivers such that two transmitters and two receivers are provided.

A remaining portion of the ultrasound chamber 103 may be filled with a coupling medium 109, such as a silicone gel, a soft epoxy, a liquid, or any other material that enables the propagation of ultrasonic waves with no, or substantially no, attenuation. Thus, the coupling medium 109 may provide acoustic (e.g., ultrasound) coupling between the transmitter 105 and the receiver 106 with no, or substantially no, attenuation. In some implementations, the material of the coupling medium 109 is also configured to provide elastic coupling to the receiver 106 and the touch structure 102 such that the receiver 106 and the touch structure 102 are mechanically coupled by the coupling medium 109. When providing mechanical coupling between the touch structure 102 and the receiver 106, the coupling medium 109 is a non-gaseous medium. In some implementations, the coupling medium 109 may provide structural support to the touch structure 102 (e.g., in instances when the lateral sides of the ultrasound chamber 103 are fully open).

The touch structure 102 has a first interface 110 and a second interface 111 that interacts with ultrasound waves, with the first interface 110 (e.g., an inner interface) being in contact with the coupling medium 109 and the second interface 111 (e.g., a touch interface) being in contact with the environment. The transmitter 105 is configured to transmit an ultrasonic transmit wave 112 towards the touch structure 102 (e.g., at the first interface 110 and the second interface 111). The first interface 110 and the second interface 111 are configured to reflect the ultrasonic transmit wave 112 back into the ultrasound chamber 103 to be received by the receiver 106 as ultrasonic reflected waves 113 and 114, respectively. The receiver 106 converts the ultrasonic reflected waves 113 and 114 into measurement signals for processing and analysis. Specifically, the first interface 110 reflects the ultrasonic transmit wave 112 by internal reflection to produce the ultrasonic reflected wave 113 and the second interface 111 reflects the ultrasonic transmit wave 112 by internal reflection to produce the ultrasonic reflected wave 114. Being that the second interface 111 is more distant from the transmitter 105 than the first interface 110, the ultrasonic reflected wave 114 occurs at a later time instance than the occurrence of the ultrasonic reflected wave 113. In this way, both ultrasonic reflected waves 113 and 114 can be measured by a respective measurement signal and evaluated.

The receiver 106 may output a continuous measurement signal while the ultrasonic reflected waves 113 and 114 are received and the sensor circuit 107 may obtain a first measurement signal from the continuous measurement signal in a first observation window corresponding to the ultrasonic reflected wave 113 and may obtain a second measurement signal from the continuous measurement signal in a second observation window corresponding to the ultrasonic reflected wave 114. Thus, the first measurement signal and the second measurement signal may be different portions of the continuous measurement signal output by the receiver 106. As will be described in greater detail below, a waveform of the ultrasonic reflected wave 114 may be particularly useful to the sensor circuit 107 for making a touch/no-touch decision because the ultrasonic reflected wave 114 is more sensitive to touches occurring at the second interface 111 (e.g., the touch interface).

Additionally, a timing difference between reception times of the ultrasonic reflected waves 113 and 114 can also be evaluated. Accordingly, the transmitter 105 and the receiver 106 are coupled together by the coupling medium 109. The coupling medium 109 and the touch structure 102 form a propagation channel between the transmitter 105 and the receiver 106.

An acoustic impedance change at the second interface 111 from a touch applied to the touch surface 104 causes a change in the ultrasonic reflected wave 114. In particular, a change in a signal amplitude of the ultrasonic reflected wave 114 changes when the touch surface 104 is touched by, for example, a finger of the user (e.g., a direct touch with skin making direct contact with the touch surface 104). The change in the ultrasonic reflected wave 114 can be detected or used at a receiver side of the ultrasonic touch sensor 100 for detecting the touch event or the no-touch event as well as determining touch location and touch force. Specifically, the touch event at the touch surface 104 may cause a damping effect where part of the energy of the ultrasonic transmit wave 112 is absorbed or dissipated by the finger. Accordingly, the signal amplitude of the ultrasonic reflected wave 114 during the touch event may be reduced relative to the signal amplitude of the ultrasonic reflected wave 114 during the no-touch event. The waveform of the ultrasonic reflected wave 114 during the no-touch event may be used by the sensor circuit 107 as a reference waveform for a touch/no-touch determination. For example, when the waveform of the ultrasonic reflected wave 114 remains similar to the reference waveform, the ultrasonic reflected wave 114 may correspond to a no-touch event. Alternatively, when a difference between the waveform of the ultrasonic reflected wave 114 and the reference waveform satisfies a threshold (e.g., the difference is greater than the threshold, the difference is greater than or equal to the threshold, or the difference satisfies another threshold condition), the ultrasonic reflected wave 114 may correspond to a touch event.

In some implementations, the signal amplitude of the ultrasonic reflected wave 114 during the no-touch event may be used by the sensor circuit 107 as a reference level for the touch/no-touch determination. The sensor circuit 107 may measure the signal amplitude of the ultrasonic reflected wave 114 and compare the signal amplitude and the reference level for the touch/no-touch determination. If a difference between the signal amplitude of the ultrasonic reflected wave 114 and the reference level satisfies a threshold (e.g., the difference is greater than the threshold, the difference is greater than or equal to the threshold, or the difference satisfies another threshold condition), the ultrasonic reflected wave 114 may correspond to a touch event. Therefore, it can be said that a property of the ultrasonic reflected wave 114 will depend on the existence or the non-existence of the touch event. The property of the reflected ultrasonic sound wave can be measured at the sensor circuit 107 to discriminate between a presence of the touch event or the no-touch event.

Meanwhile, it can be said that the acoustic impedance change resulting from the touch event is minimal at the first interface 110. As a result, the acoustic impedance change may not cause a measurable change in a property of the ultrasonic reflected wave 113. In other words, the ultrasonic reflected wave 113 may not undergo a measurable change as a result of a change in the acoustic impedance at the touch surface 104. As a result, the ultrasonic reflected wave 114 may be used for detecting changes in the acoustic impedance at the touch surface 104 for discriminating between the touch event and the no-touch event.

In particular, the touch event at the touch surface 104 of the touch structure 102 causes a change in a property of the propagation channel (e.g., a property at the second interface 111) and thereby changes the propagation of the ultrasound waves through the propagation channel from the transmitter 105 to the receiver 106. In other words, a property of an ultrasound wave propagating along the propagation channel changes in response to a touch event at the touch surface 104 and the sensor circuit 107 is configured to detect the touch event, including one or more characteristics thereof, including an amount of contact pressure, a contact duration, and a contact location on the touch surface 104.

During operation of the ultrasonic touch sensor 100, the sensor circuit 107 is configured to apply a touch detection algorithm to distinguish between the touch event and the no-touch event. The touch detection algorithm may take into account or be insensitive to various disturbances, including electrical and ultrasonic cross-talk, multipath propagation, noise, temperature, environmental disturbances, such as dirt or water on the touch surface 104. The touch detection algorithm may take into account or be insensitive to various calibration factors, including different touch surfaces, variations in mounting, non-linear behaviors, large offsets, and drifting effects.

The touch detection algorithm may include a machine learning model that is trained to distinguish between a touch and no-touch event. Machine learning involves computers learning from data to perform tasks. Machine learning algorithms are used to train machine learning models based on sample data, known as "training data." Once trained, machine learning models may be used to make predictions, decisions, or classifications relating to new observations. The sensor circuit 107 may distinguish between a touch and no-touch event using a machine learning model. The machine learning model may include and/or may be associated with, for example, a neural network. In some implementations, the sensor circuit 107 uses the machine learning model to distinguish between a touch and no-touch event by providing candidate parameters as input to the machine learning model, and using the machine learning model to determine a likelihood, probability, or confidence that a particular outcome (e.g., that a no-touch is detected or that a touch is detected at the touch surface 104) for a subsequent touch detection operation will be determined using the candidate parameters. In some implementations, the sensor circuit 107 provides one or more measurements as input to the machine learning model, and the sensor circuit 107 uses the machine learning model to determine or identify a particular result that is most probable, for example, that a no-touch, a touch, a short touch, a long touch, a soft touch, a hard touch, a static touch, or a dynamic (e.g., a moving) touch is present at the touch surface 104.

The sensor circuit 107 may train, update, and/or refine the machine learning model to increase the accuracy of the outcomes and/or parameters determined using the machine learning model. The sensor circuit 107 may train, update, and/or refine the machine learning model based on feedback and/or results from the subsequent touch detection operation, as well as from historical or related touch detection operations (e.g., from hundreds, thousands, or more historical or related touch detection operations) performed by the sensor circuit 107.

The touch event at the touch surface 104 of the touch structure 102 may also cause a change in a property of the receiver 106. For example, the touch force of the touch event may change a sensitivity of the receiver 106 due to an internal pressure acting on the flexible membrane of the receiver 106 caused by the touch force. The sensor circuit 107 may exploit this change in sensitivity to detect an external force applied to the touch surface 104, including the touch force of the touch event.

During operation of the ultrasonic touch sensor 100, the sensor circuit 107 is configured to generate the ultrasonic transmit wave 112 for each touch/no-touch decision by applying an excitation signal. Upon receipt of each ultrasonic reflected wave, the sensor circuit 107 makes a touch/no-touch decision using the touch detection algorithm. A time between subsequent touch detections (i.e., between successive excitation signals) can be in the order of 25 microseconds (µs), for example. A period between triggering an excitation signal and a next excitation signal may be referred to as an excitation frame. The sensor circuit 107 is configured to analyze reflected ultrasound waves for each excitation frame to make a touch/no-touch decision on a frame-by-frame basis. Lower power consumption and higher frame rates (e.g., less time between excitation signals) may be enabled when the touch detection algorithm is lower in complexity, for example, because the sensor circuit 107 is able to make the touch/no-touch decision more quickly when the touch detection algorithm is less complex.

An excitation signal may be a short signal pulse or a pulse train comprised of multiple short pulses (e.g., having a duration of about 100 nanoseconds (ns) up to about 1 µs). An excitation signal can have any shape (e.g., rectangular, sinusoid, Gaussian, Gaussian derivative, etc.) or may be a chirp signal whose frequency continuously increases or decreases from a start frequency to a stop frequency, for example, by using linear frequency modulation. Thus, an excitation signal may have either a fixed (constant) frequency or a changing (modulated) frequency. In a pulse train, the pulses may have a same frequency or may have different frequencies and/or the same pulse duration (i.e., bandwidth) or different pulse durations (i.e., bandwidths). A signal amplitude of the excitation signals is also configurable and may vary between excitation signals. Pulses of a pulse train may have a constant (fixed) amplitude or varied amplitudes. A number of pulses used in a pulse train is also configurable among excitation signals. A pulse frequency (i.e., a period between successive pulses of a pulse train) may also be configurable and may be different among excitation signals that have a pulse train. A pulse train comprising signal chirps may have fixed (constant) start and stop frequencies among signal chirps or may have variable start and/or stop frequencies among signal chirps. The signal chirps may have the same pulse duration or have different pulse durations.

On the receiver side, the sensor circuit 107 includes an analog signal processing chain and/or a digital signal processing chain, both of which may include one or more optional components. The analog signal processing chain may include a direct down-converter and a low-pass filter as optional components. The direct down-converter may include any form of direct down-conversion of the ultrasonic reflected waves 113 and 114. For example, squaring, absolute value, or rectification, among other examples may be used for performing the direct down-conversion. Analog circuit blocks for such a down-conversion processing can be a multiplier or even just a diode. A low-pass filter cut-off frequency should be tuned to the bandwidth of the transmitted ultrasonic signal and the bandwidth of the transmitter 105. For example, the low-pass filter cut-off frequency could be set to 1 MHz or 2 MHz.

In some implementations, the sensor circuit 107 may include an analog-to-digital converter (ADC) that is configured to generate multiple digital samples (e.g., measurement samples) from the ultrasonic reflected waves 113 and 114 for each ultrasonic transmit wave 112 and store the digital samples in memory for evaluation. Additionally, or alternatively, in some implementations, the sensor circuit 107 may include an ADC that is configured to generate multiple digital samples from a measurement signal obtained from measuring another property of the ultrasonic touch sensor 100 (e.g., internal pressure, bias voltage, or a cross-coupling effect) and store the digital samples in memory for evaluation.

A digital processor of the sensor circuit 107 is operable to evaluate digital samples received in an observation window using the touch detection algorithm to determine whether there is the no-touch event or the touch event corresponding to the ultrasonic transmit wave 112. The digital processor may use different observation windows for evaluating the ultrasonic reflected waves 113 and 114, which is possible due to a timing difference between when the ultrasonic reflected wave 113 is reflected by the first interface 110 and when the ultrasonic reflected wave 114 is reflected by the second interface 111. That is, the sensor circuit 107 can anticipate when the ultrasonic reflected waves 113 and 114 will be received based on a principle of time-of-flight. For example, a time-of-flight of a first reflection (e.g., the ultrasonic reflected wave 113) is a time it takes for the ultrasonic transmit wave 112 to travel from the transmitter 105, to the first interface 110, and back to the receiver 106. Likewise, a time-of-flight of a second reflection (e.g., the ultrasonic reflected wave 114) is a time it takes for the ultrasonic transmit wave 112 to travel from the transmitter 105, to the second interface 111, and back to the receiver 106. In both instances, an approximate distance traveled and the speed of travel of the ultrasonic signal are known parameters. Thus, each observation window has a predetermined start time and a predetermined end time for evaluating a respective one of the ultrasonic reflected waves 113 and 114.

As indicated above, FIG. 1 is provided merely as an example. Other examples are possible and may differ from what was described with regard to FIG. 1. For example, in some implementations, an array or transmitters, receivers, or transceivers may be provided within the ultrasound chamber 103 of the ultrasonic touch sensor 100. In some implementations, the touch structure 102 may include multiple layers resulting in more than two ultrasound reflections or echoes. In some implementations, additional circuit components may be added without deviating from the disclosure provided above.

FIGS. 2A and 2B illustrate an ultrasonic touch sensor 200 according to one or more implementations. The ultrasonic touch sensor 200 is similar to the ultrasonic touch sensor 100 shown in FIG. 1. Additionally, FIGS. 2A and 2B show capacitive paths that are formed between different components of the ultrasonic touch sensor 200. FIG. 2A shows capacitive paths present during a no-touch event, and FIG. 2B shows capacitive paths present during a touch event, which may include direct touches, during which skin of a user makes direct contact with the touch surface 104 of the touch structure 102, and indirect touches, during which the skin of the user makes indirect contact with the touch surface 104 of the touch structure 102 (e.g., during instances when the user is wearing a glove).

In FIG. 2A, the transmitter 105 and the receiver 106 are coupled by a capacitive path 201. For example, the capacitive path 201 is an electrical path that may capacitively couple the flexible membrane of the transmitter 105 with the flexible membrane of the receiver 106. As described above, the coupling medium 109 couples the transmitter 105 and the receiver 106. A coupling of the transmitter 105 and the receiver 106 provided by the coupling medium 109 may be a mechanical coupling, an acoustic coupling, and/or an electrical coupling (e.g., a capacitive coupling). As a result, the coupling medium 109 may capacitively couple the transmitter 105 and the receiver 106 to form the capacitive path 201.

Additionally, the receiver 106 and the touch structure 102 are coupled by a capacitive path 202 that is formed in series with the capacitive path 201. The coupling medium 109 may capacitively couple the receiver 106 and the touch structure 102 to form the capacitive path 202. Thus, a first capacitive path comprising the capacitive path 201 and the capacitive path 202 is formed that includes the touch structure 102 and a path through the coupling medium 109, including a capacitive coupling between the transmitter 105 and the receiver 106.

Additionally, the transmitter 105 and the touch structure 102 are coupled by a capacitive path 203 that is formed in series with the capacitive path 201 and the capacitive path 202. The coupling medium 109 may capacitively couple the transmitter 105 and the touch structure 102 to form the capacitive path 203. Thus, a second capacitive path comprising the capacitive path 201 and the capacitive path 203 is formed that includes the touch structure 102, the transmitter 105, and a path through the coupling medium 109, including a capacitive coupling between the transmitter 105 and the receiver 106.

A capacitive network that includes the capacitive paths 201, 202, and 203 exists even without a touch event. Without a touch event, the capacitive paths 202 and 203 are in series with each other and the capacitive paths 202 and 203 contribute to increasing the capacitive coupling along capacitive path 201 between the transmitter 105 and the receiver 106.

As described above in conjunction with FIG. 1, the signal generator of the sensor circuit 107 generates an excitation signal for producing an ultrasonic transmit wave. The receiver 106 is influenced by the excitation signal whereby the excitation signal induces a capacitive cross-talk on at least one of the capacitive path 201 or the capacitive path 202 of the first capacitive path. For example, the capacitive cross-talk may cause the flexible membrane of the receiver 106 to vibrate. As a result, the capacitive cross-talk is detectable at the receiver 106 due to the capacitive coupling between the transmitter 105 and the receiver 106 and a cross-coupling effect imposed on the flexible membrane of the receiver 106. Thus, the receiver 106 is configured to generate a measurement signal representative of the capacitive cross-talk and transmit the measurement signal to the sensor circuit 107 for evaluation. Additionally, the flexible membrane of the receiver 106 also detects the ultrasonic reflected waves 113 and 114 and produces measurement signals corresponding thereto.

The sensor circuit 107 may include a measurement circuit that is coupled to the receiver 106 and configured to perform a comparison of the measurement signal with a threshold and determine whether a no-touch event or a touch event has occurred at the touch surface 104 based on whether the measurement signal satisfies the threshold. For example, the measurement circuit may detect the no-touch event when the measurement signal does not satisfy the threshold, and detect the touch event when the measurement signal does satisfy the threshold.

In some implementations, during a configuration phase of the ultrasonic touch sensor 200, the measurement signal (e.g., a no-touch measurement signal) may be measured by the sensor circuit 107 during a no-touch event, and the no-touch measurement signal may be used by the sensor circuit 107 as a reference signal for determining future touch/no-touch decisions. For example, a signal waveform of the no-touch measurement signal, signal pattern of the no-touch measurement signal, or a signal value obtained from the no-touch measurement signal (e.g., obtained from the reference signal) may be recorded as a reference waveform, a reference pattern, or a reference value, respectively, and used as a reference for determining future touch/no-touch decisions. Additionally, the threshold used for determining future touch/no-touch decisions may be determined based on the reference waveform, the reference pattern, or the reference value.

During a touch event, shown in FIG. 2B, a touch is equivalent to an electrical grounding of the touch surface 104, at a surface node SN coupled to and between the capacitive paths 202 and 203, and the electrical grounding has an effect of an electrical shield. In other words, a touch event that produces a shielding effect. The electrical grounding is present for both direct touches and indirect touches, as the electrical grounding is made even through fibers or a glove. As a result, a property of the at least one of the capacitive path 201, the capacitive path 202, or the capacitive path 203 changes in response to the touch event, which causes a property of the capacitive cross-talk detected at the receiver 106 to change. In some implementations, the transmitter 105 and the touch structure 102 are configured such that a touch made during the touch event produces a shielding effect between the transmitter 105 and the receiver 106 that causes a reduction in the capacitive cross-talk.

For example, FIG. 2B shows that a grounding path 204, that includes a grounding of the surface node SN, is formed during a touch event that produces the shielding effect. In particular, the touch structure 102 is configured such that the grounding path 204, which couples the capacitive paths 202 and 203 to ground (GND), is formed during the touch event. With the grounding path 204 formed, the capacitive paths 202 and 203 contribute less to the capacitive coupling along capacitive path 201 between the transmitter 105 and the receiver 106. In other words, the capacitive coupling along capacitive path 201 decreases. The grounding path 204, which includes at least one of the capacitive paths 202 or 203 may be formed via a capacitive coupling through the coupling medium 109 and the touch structure 102. For example, the grounding path 204 may be formed from the transmitter 105, through the coupling medium 109, through the touch structure 102, through a body of the user, and to ground (GND) and/or the grounding path 204 may be formed from the receiver 106, through the coupling medium 109, through the touch structure 102, through a body of the user, and to ground (GND). Because the grounding path 204 includes at least one of the capacitive paths 201, 202, or 203, if not all capacitive paths 201, 202, or 203, in addition to a ground connection to ground (GND), the grounding path 204 may be referred to as a capacitive path that is formed during a touch event with the ground connection in series with at least one of the capacitive paths 201, 202, or 203.

As a result of the grounding path 204 being formed in series with the capacitive path 201, the formation of the grounding path 204 during the touch event causes a reduction in the capacitive cross-talk detected at the receiver 106. Thus, the forming of the grounding path 204 during the touch event causes an amplitude of the measurement signal, generated by the receive 106 and representative of the capacitive cross-talk, to decrease. In other words, the measurement signal (e.g., a touch measurement signal), representative of the capacitive cross-talk during the touch event, deviates from the reference signal (e.g., a prerecorded no-touch measurement signal). The grounding path 204 is formed during both direct touches and indirect touches, since the grounding path 204 does not require skin contact to be formed but the grounding path 204 can also be formed through contact with fibers of a glove. Therefore, a presence or an absence of the grounding path 204 can be used to appropriately discriminate between touch events and no-touch events, respectively, including touch events from indirect touch, such as those involving the user wearing a glove. A touch detection algorithm that uses the capacitive cross-talk for making touch/no-touch decisions may increase the robustness of touch sensing in CMUT implementations by using the intrinsic capacitive cross-talk effect of capacitive MEMS.

As indicated above, FIGS. 2A and 2B are provided merely as examples. Other examples are possible and may differ from what was described with regard to FIGS. 2A and 2B. For example, in some implementations, an array or transmitters, receivers, or transceivers may be provided within the ultrasound chamber 103 of the ultrasonic touch sensor 200. In some implementations, the touch structure 102 may include multiple layers resulting in more than two ultrasound reflections or echoes. In some implementations, additional circuit components may be added without deviating from the disclosure provided above.

Figure 3A:
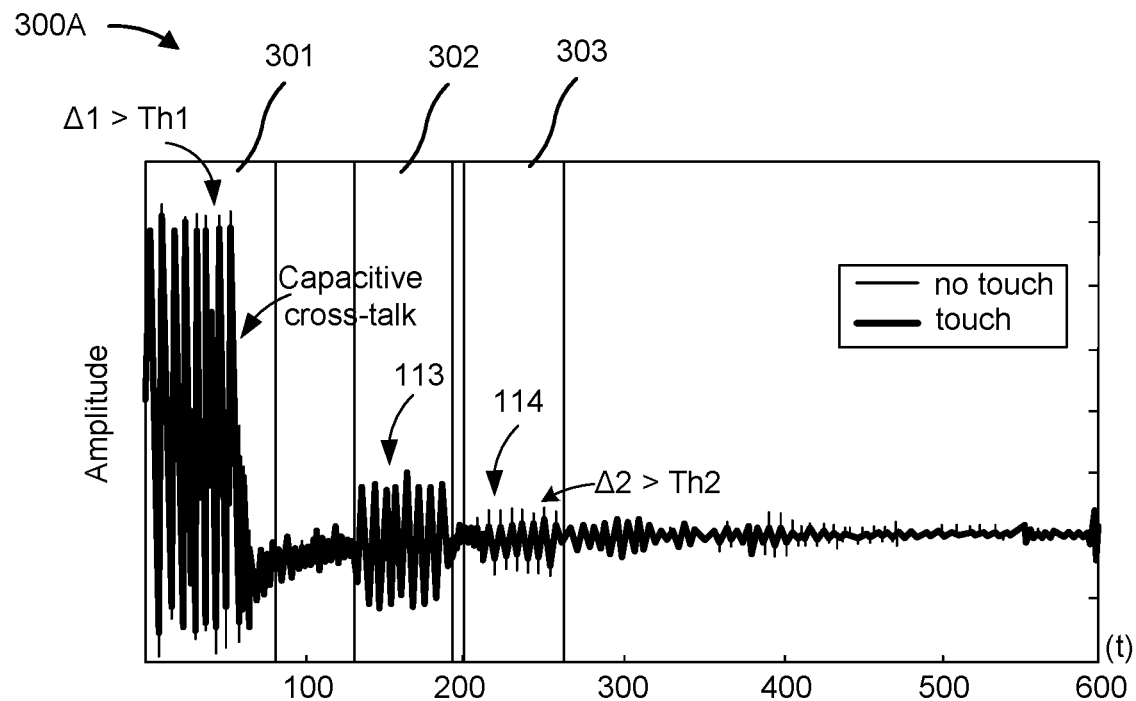
FIG. 3A illustrates a signal diagram of a no-touch measurement signal and a touch measurement signal according to one or more implementations.
Figure 3B:
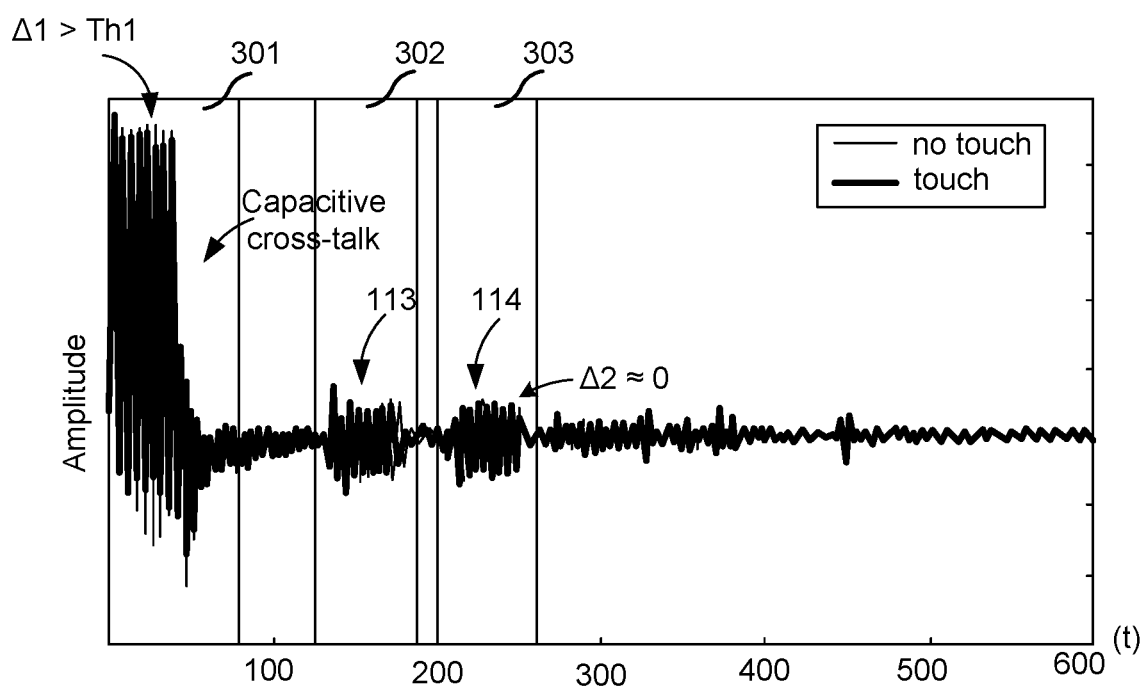
FIG. 3B illustrates a signal diagram of a no-touch measurement signal and a touch measurement signal according to one or more implementations.

FIG. 3A illustrates a signal diagram 300A of a no-touch measurement signal and a touch measurement signal according to one or more implementations. For example, the signal diagram 300A corresponds to a touch event during which a direct touch is applied to the touch surface 104 of the touch structure 102. FIG. 3B illustrates a signal diagram 300B of a no-touch measurement signal and a touch measurement signal according to one or more implementations. For example, the signal diagram 300B corresponds to a touch event during which an indirect touch is applied to the touch surface 104 of the touch structure 102.

The no-touch measurement signal is generated and output by the receiver 106 during a no-touch event and the touch measurement signal is generated and output by the receiver 106 during direct touch event during which a direct touch is applied to the touch structure 102. The signal diagrams 300A and 300B show a first observation window 301 during which capacitive cross-talk occurs. For example, the receiver 106 is influenced by the excitation signal, whereby the excitation signal induces the capacitive cross-talk on capacitive path 201. The excitation signal induces the capacitive cross-talk on the capacitive path 201 for a first predetermined time interval which begins at a transmission time (e.g., a transmission start time) of excitation signal and ends prior to the receiver 106 receiving the ultrasonic reflected waves 113 and 114. Thus, the first observation window 301 may represent a first predetermined measurement interval during which the capacitive cross-talk is measured by the sensor circuit 107. For example, the first observation window 301 may be configured to target the first predetermined time interval during which the capacitive cross-talk on the capacitive path 201 occurs.

The measurement circuit of the sensor circuit 107 is configured to measure the measurement signal during the first predetermined time interval (e.g., during the first observation window 301) to obtain a first measurement (e.g., a first measured value) of the measurement signal, perform a comparison of the first measurement with a first threshold Th1, and determine whether the no-touch event or the touch event has occurred at the touch surface 104 based on whether the first measurement satisfies the first threshold Th1. For example, if the first measurement signal measured during the first observation window 301 is similar, or substantially similar to, a reference signal, the sensor circuit 107 may determine that the measurement signal is a no-touch measurement signal and that a touch is not present at the touch surface 104. As described above, the reference signal may have been previously recorded or measured during the first observation window 301 during a no-touch event.

On the other hand, if the measurement signal measured during the first observation window 301 deviates from the reference signal, for example, by an amount sufficient to satisfy the first threshold Th1, the sensor circuit 107 may determine that the measurement signal is the touch measurement signal and that a touch is present at the touch surface 104. For example, the measurement signal measured during the first observation window 301 may deviate from the reference signal by the amount sufficient to satisfy the first threshold Th1 when the grounding path 204 is formed during a touch event. As a result of the grounding path 204 being formed during the touch event, an amplitude of the measurement signal is reduced during the first observation window 301. Accordingly, a difference Δ1 between the no-touch measurement signal and the touch measurement signal can be observed in the first observation window 301, with an amplitude of the touch measurement signal being reduced relative to the no-touch measurement signal. The difference Δ1 can be detected by the sensor circuit 107 to make a touch/no-touch decision. For example, the difference Δ1 can be measured and compared to a first difference threshold used as the first threshold Th1 or the amplitude of the measurement signal can be measured during the first observation window 301 and compared to a first amplitude threshold used as the first threshold Th1.

The signal diagrams 300A and 300B show a second observation window 302 during which the ultrasonic reflected wave 113 is received by the receiver 106 as a result of the ultrasonic transmit wave 112 being reflected by the first interface 110. However, in this example, the measurement signal does not undergo a measurable change as a result of a touch event in the second observation window 302. Accordingly, the sensor circuit 107 may ignore the measurement signal during the second observation window 302.

The signal diagrams 300A and 300B show a third observation window 303 during which the ultrasonic reflected wave 114 is received by the receiver 106 as a result of the ultrasonic transmit wave 112 being reflected by the second interface 111. The amplitude of the measurement signal during the third observation window 303 is affected (e.g., reduced) by direct touches but is substantially unaffected by indirect touches and no-touches. Thus, the measurement circuit of the sensor circuit 107 may measure the measurement signal during a second predetermined time interval (e.g., during the third observation window 303) to obtain a second measurement (e.g., a measured value) of the measurement signal, perform a comparison of the second measurement with a second threshold Th2, and determine whether the no-touch event or the touch event has occurred at the touch surface 104 based on whether the second measurement satisfies the second threshold Th2.

For example, if the measurement signal measured during the third observation window 303 is similar, or substantially similar to, the reference signal, the sensor circuit 107 may determine that the measurement signal is a no-touch measurement signal and that a touch is not present at the touch surface 104. As described above, the reference signal may have been previously recorded or measured during the third observation window 303 during a no-touch event. However, the measurement signal during the third observation window 303 is sensitive to direct touches and substantially insensitive to indirect touches, such as touches made with a glove. Therefore, if the measurement signal measured during the third observation window 303 is similar, or substantially similar to, the reference signal, the measurement signal may be indicative of an indirect touch.

On the other hand, if the measurement signal measured during the third observation window 303 deviates from the reference signal, for example, by an amount sufficient to satisfy the second threshold Th2, the sensor circuit 107 may determine that the measurement signal is the touch measurement signal and that a touch is present at the touch surface 104. For example, the measurement signal measured during the third observation window 303 may deviate from the reference signal by the amount sufficient to satisfy the second threshold Th2 when a direct touch, with direct skin contact, is applied to the touch surface 104. Accordingly, a difference 42 between the no-touch measurement signal and the touch measurement signal can be observed in the third observation window 303, with an amplitude of the touch measurement signal being reduced relative to the no-touch measurement signal. The difference 42 can be detected by the sensor circuit 107 to make a touch/no-touch decision. For example, the difference 42 can be measured and compared to a second difference threshold used as the second threshold Th2 or the amplitude of the measurement signal can be measured during the third observation window 303 and compared to a second amplitude threshold used as the second threshold Th2.

Some touch detection algorithms (e.g., amplitude-based detection algorithms) can look only at the echo of the ultrasonic reflected wave 114 in the third observation window 303. Some touch detection algorithms (e.g., Euclidian distance-based detection algorithms) analyze the signal in a wider window that stretches in time to include secondary echoes that occur after the echo of ultrasonic reflected wave 114. The secondary echoes correspond to ultrasonic reflected waves traveling back and forth more than one time between various interfaces, and some of these echoes hit the second interface 111 multiple times, thereby picking up a useful energy difference between touch and no touch events. These secondary echoes are visible in FIGS. 3A and 3B, occurring after the echo of the ultrasonic reflected wave 114. Thus, the size (e.g., width) of the third observation window 303 can be adjusted according to the touch detection algorithm used by the sensor circuit 107.

In some implementations, a first measurement result obtained during the first observation window 301 and a second measurement result obtained during the third observation window 303 may be used in combination to make a touch/no-touch decision and a direct touch/indirect touch decision. For example, if the sensor circuit 107 determines that the measurement signal measured during the first observation window 301 does not satisfy the first threshold Th1, the sensor circuit 107 may detect a no-touch event (e.g., that neither a direct touch nor an indirect touch is present at the touch surface 104). In this case, the sensor circuit 107 may wait for a next excitation frame to make another touch/no-touch decision.

If the sensor circuit 107 determines that the measurement signal measured during the first observation window 301 does satisfy the first threshold Th1 (e.g., an amplitude of the measurement signal during the first observation window 301 is less than the first threshold Th1), the sensor circuit 107 may detect a touch event (e.g., that either a direct touch or an indirect touch is present at the touch surface 104). In this case, the sensor circuit 107 may evaluate the measurement signal during the third observation window 303 to make a direct touch/indirect touch decision. If, after detecting the touch event during the first observation window 301, the sensor circuit 107 determines that the measurement signal measured during the third observation window 303 does not satisfy the second threshold Th2, the sensor circuit 107 may detect an indirect touch event (e.g., an indirect touch is present at the touch surface 104). This is because the measurement signal measured during the third observation window 303 is substantially insensitive to indirect touches. On the other hand, if, after detecting the touch event during the first observation window 301, the sensor circuit 107 determines that the measurement signal measured during the third observation window 303 does satisfy the second threshold Th2 (e.g., an amplitude of the measurement signal during the third observation window 303 is less than the second threshold Th2), the sensor circuit 107 may detect a direct touch event (e.g., a direct touch is present at the touch surface 104). This is because the measurement signal measured during the third observation window 303 is sensitive to direct touches.

The signal diagram 300A shows a situation in which a direct touch is present at the touch surface 104. In FIG. 3A, the difference Δ1 satisfies the first threshold Th1 and the difference Δ2 satisfies the second threshold Th2. The signal diagram 300B shows a situation in which an indirect touch is present at the touch surface 104. In FIG. 3B, the difference Δ1 satisfies the first threshold Th1 but the difference Δ2 does not satisfy the second threshold Th2. In can be appreciated from the signal diagrams 300A and 300B that no touch is present when the difference Δ1 does not satisfy the first threshold Th1 and the difference Δ2 does not satisfy the second threshold Th2, or, simply, when the difference Δ1 does not satisfy the first threshold Th1.

As indicated above, FIGS. 3A and 3B are provided merely as examples. Other examples are possible and may differ from what was described with regard to FIGS. 3A and 3B. For example, in practice, a no-touch measurement signal and a touch measurement signal may differ from the no-touch measurement signals and the touch measurement signals shown in FIGS. 3A and 3B. In addition, in some implementations, any of the observation windows, including the first observation window 301, the second observation window 302, and the third observation window 303, may differ from those shown in FIGS. 3A and 3B. In some implementations, the touch structure 102 may include multiple layers resulting in more than two ultrasound reflections or echoes, including two or more ultrasound reflections or echoes that may be used for detecting no-touches, touches, indirect touches, and direct touches.

Figure 4:
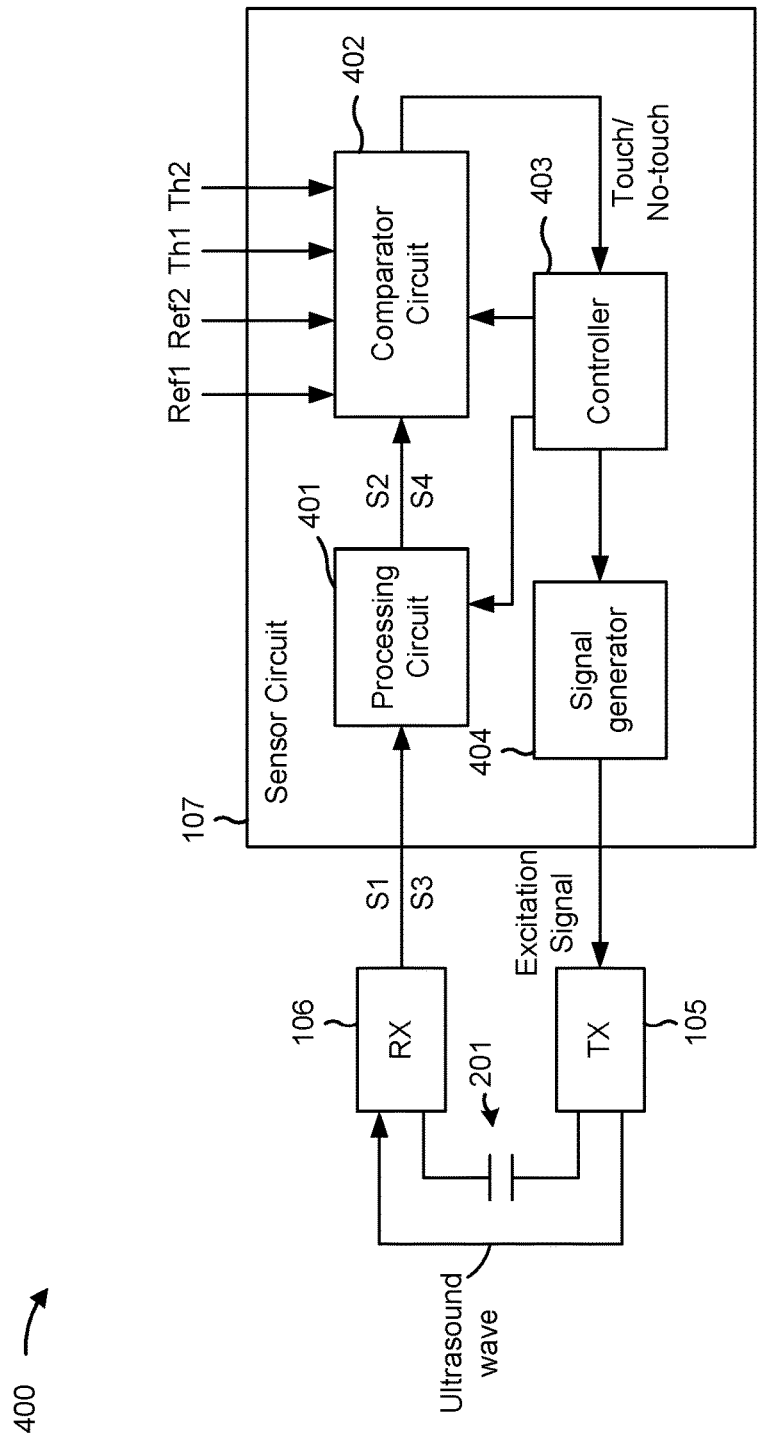
FIG. 4 illustrates a schematic block diagram of an ultrasonic touch sensor according to one or more implementations.

FIG. 4 illustrates a schematic block diagram of an ultrasonic touch sensor 400 according to one or more implementations. The ultrasonic touch sensor 400 is similar to the ultrasonic touch sensors 100 and 200 described above in conjunction with FIGS. 1, 2A, and 2B. The ultrasonic touch sensor 400 includes the transmitter 105 and the receiver 106. The transmitter 105 and the receiver 106 are acoustically coupled such that the receiver 106 receives reflected ultrasound waves (e.g., ultrasonic reflected waves 113 and 114) from an ultrasound wave (e.g., ultrasonic transmit wave 112) transmitted by the transmitter 105. In addition, the transmitter 105 and the receiver 106 are capacitively coupled by the capacitive path 201.

The ultrasonic touch sensor 400 also includes a sensor circuit 107 that is electrically coupled to the transmitter 105 and the receiver 106. In some implementations, the sensor circuit 107 includes a processing circuit 401, a comparator circuit 402, a controller 403, and a signal generator 404. The processing circuit 401 and the comparator circuit 402 may form a measurement circuit used for measuring signals and determining whether a no-touch event or a touch event has occurred at the touch surface 104.

In some implementations, the controller 403 may control (e.g., trigger) the signal generator 404 to generate an excitation signal and transmit the excitation signal to the transmitter 105. The transmitter 105 is configured to receive the excitation signal and transmit the ultrasonic transmit wave 112 towards the touch structure 102 based on the excitation signal. The excitation signal induces a capacitive cross-talk on the capacitive path 201 and the receiver 106 is configured to generate a first measurement signal S1 during the first observation window 301 that is representative of the capacitive cross-talk. For example, the receiver 106 may be configured to convert the capacitive cross-talk into the first measurement signal S1 during the first observation window 301.

The processing circuit 401 is configured to process the first measurement signal S1 in order to determine a feature of the first measurement signal S1 and generate a measured value S2 based on the feature of the first measurement signal S1. In some implementations, the processing circuit 401 may include a processor, included in the sensor circuit 107, that is configured to evaluate the feature of the first measurement signal S1 in order to generate the measured value S2 that is representative of the feature of the first measurement signal S1. The processor may include an analog processing circuit that operates in an analog domain, a digital processing circuit that operates in a digital domain, or both the analog processing circuit and the digital processing circuit, for evaluating the feature of the first measurement signal S1 and for generating the measured value S2. Thus, the measured value S2 may be an analog value or a digital value.

The processor may be operable in combination with other processing components of the processing circuit 401 described herein to generate the measured value. For example, the processing circuit 401 may include an ADC that converts the first measurement signal S1 into the digital domain for processing by a digital processor, such as a digital signal processor (DSP). The ADC may generate multiple digital samples (e.g., measurement samples) from the first measurement signal S1 during the first observation window 301, the second observation window 302, or the third observation window 303 and provide the multiple digital samples to the digital processor for processing. The processor may receive the multiple digital samples and generate the measured value S2 from one or more of the multiple digital samples.

In some implementations, the processing circuit 401 (e.g., the processor) may be configured to measure a function of an amplitude of the first measurement signal S1 during the first observation window 301 to generate the measured value S2. For example, the measured value S2 may be a global extremum of the first measurement signal S1 measured within a predetermined measurement interval (e.g., the first observation window 301), a maximum peak-to-peak amplitude of the first measurement signal S1 measured within the predetermined measurement interval, an average amplitude of the first measurement signal S1 measured within the predetermined measurement interval, or a median amplitude of the first measurement signal S1 measured within the predetermined measurement interval.

In some implementations, the processing circuit 401 (e.g., the processor) may be configured to calculate a distance of the first measurement signal S1 relative to the reference signal during the first observation window 301 to generate the measured value S2. For example, the processing circuit 401 may calculate an Euclidean distance between the first measurement signal S1 and the reference signal as the measured value S2, a squared Euclidian distance between the first measurement signal S1 and the reference signal as the measured value S2, a Chebysev distance between the first measurement signal S1 and the reference signal as the measured value S2, a Manhattan distance between the first measurement signal S1 and the reference signal as the measured value S2, or a Minkowski distance between the first measurement signal S1 and the reference signal as the measured value S2.

The comparator circuit 402 is configured to perform a comparison of the first measurement signal S1 with the first threshold Th1 and determine whether a no-touch event or a touch event has occurred at the touch surface 104 based on whether the first measurement signal S1 satisfies the first threshold Th1. In some implementations, the comparator circuit 402 may compare the measured value S2 to the first threshold Th1, detect the no-touch event when the measured value S2 does not satisfy the first threshold Th1 (e.g., the measured value S2 is equal to or greater than the first threshold Th1, the measured value S2 is greater than the first threshold Th1, or the measured value S2 does not satisfy another condition relative to the first threshold Th1), and detect the touch event when the measured value S2 satisfies the first threshold Th1 (e.g., the measured value S2 is equal to or less than the first threshold Th1, the measured value S2 is less the first threshold Th1, or the measured value S2 satisfies another condition relative to the first threshold Th1).

In some implementations, the comparator circuit 402 may detect the no-touch event when a difference between the measured value S2 and a first reference value Ref1 does not satisfy the first threshold Th1 (e.g., the difference is equal to or less than the first threshold Th1, the difference is less the first threshold Th1, or the difference satisfies another condition relative to the first threshold Th1), and detect the touch event when the difference between the measured value S2 and the first reference value Ref1 satisfies the first threshold Th1 (e.g., the difference is equal to or greater than the first threshold Th1, the difference is greater than the first threshold Th1, or the difference satisfies another condition relative to the first threshold Th1). For example, the comparator circuit 402 may calculate the difference between the measured value S2 and the first reference value Ref1 for performing a comparison of the difference with the first threshold Th1 for generating a comparison result.

If the sensor circuit 107 calculates the measured value S2 as the distance of the first measurement signal S1 relative to the reference signal, the comparator circuit 402 may be configured to detect the no-touch event when a difference between the measured value S2 and the first reference value Ref1 does not satisfy the first threshold Th1 (e.g., the difference is equal to or less than the first threshold Th1, the difference is less the first threshold Th1, or the difference satisfies another condition relative to the first threshold Th1), and may detect the touch event when the difference between the measured value S2 and the first reference value Ref1 satisfies the first threshold Th1 (e.g., the difference is equal to or greater than the first threshold Th1, the difference is greater than the first threshold Th1, or the difference satisfies another condition relative to the first threshold Th1).

The comparator circuit 402 is configured to make a touch/no-touch decision based on the comparison result. The comparator circuit 402 may transmit an output signal that is indicative of the touch/no-touch decision to the controller 403 that may be configured to perform additional actions or functions based on a result of the touch/no-touch decision. For example, if comparator circuit 402 detects a touch event, the controller 403 may control the processing circuit 401 and the comparator circuit 402 to evaluate a measurement signal of the ultrasonic reflected wave 114 to make a direct touch/indirect touch decision.

In order to make the direct touch/indirect touch decision, the processing circuit 401 may obtain a second measurement signal S3 during the third observation window 303, process the second measurement signal S3 in order to determine a feature of the second measurement signal S3, and generate a measured value S4 based on the feature of the second measurement signal S3. Accordingly, the second measurement signal S3 is representative of the ultrasonic reflected wave 114. In some implementations, the processing circuit 401 may be configured to measure a function of an amplitude of the second measurement signal S3 during the first observation window 301 to generate the measured value S4. In some implementations, the processing circuit 401 may be configured to calculate a distance of the second measurement signal S3 relative to the reference signal during the third observation window 303 to generate the measured value S4.

The comparator circuit 402 is configured to perform a comparison of the second measurement signal S3 with a second threshold Th2 and determine whether a direct touch event or an indirect touch event has occurred at the touch surface 104 based on whether the second measurement signal S3 satisfies the second threshold Th2. In some implementations, the comparator circuit 402 may compare the measured value S4 to the second threshold Th2, detect the indirect touch event when the measured value S4 does not satisfy the second threshold Th2 (e.g., the measured value S4 is equal to or greater than the second threshold Th2, the measured value S4 is greater than the second threshold Th2, or the measured value S4 does not satisfy another condition relative to the second threshold Th2), and detect the direct touch event when the measured value S4 satisfies the second threshold Th2 (e.g., the measured value S4 is equal to or less than the second threshold Th2, the measured value S4 is less the second threshold Th2, or the measured value S4 satisfies another condition relative to the second threshold Th2).

In some implementations, the comparator circuit 402 may detect the indirect touch event when a difference between the measured value S4 and a second reference value Ref2 does not satisfy the second threshold Th2 (e.g., the difference is equal to or less than the second threshold Th2, the difference is less the second threshold Th2, or the difference satisfies another condition relative to the second threshold Th2), and detect the direct touch event when the difference between the measured value S4 and the second reference value Ref2 satisfies the second threshold Th2 (e.g., the difference is equal to or greater than the second threshold Th2, the difference is greater than the second threshold Th2, or the difference satisfies another condition relative to the second threshold Th2). For example, the comparator circuit 402 may calculate the difference between the measured value S4 and the second reference value Ref2 for performing a comparison of the difference with the second threshold Th2 to generate a comparison result.

If the sensor circuit 107 calculates the measured value S4 as the distance of the second measurement signal S3 relative to the reference signal, the comparator circuit 402 may be configured to detect the indirect touch event when a difference between the measured value S4 and the second reference value Ref1 does not satisfy the second threshold Th2 (e.g., the difference is equal to or less than the second threshold Th2, the difference is less the second threshold Th2, or the difference satisfies another condition relative to the second threshold Th2), and may detect the direct touch event when the difference between the measured value S4 and the second reference value Ref1 satisfies the second threshold Th2 (e.g., the difference is equal to or greater than the second threshold Th2, the difference is greater than the second threshold Th2, or the difference satisfies another condition relative to the second threshold Th2).

The comparator circuit 402 is configured to make a direct touch/indirect touch decision based on the comparison result. The comparator circuit 402 may transmit another output signal that is indicative of the direct touch/indirect touch decision to the controller 403 that may be configured to perform additional actions or functions based on a result of the direct touch/indirect touch decision. For example, the controller 403 may adjust a sensitivity of the receiver 106 or a transmission power of the transmitter 105 based on the direct touch/indirect touch decision. For example, the controller 403 may increase the sensitivity of the receiver 106 and/or increase the transmission power of the transmitter 105 when an indirect touch is detected in order to increase a reliability of detecting indirect touches, since it may be assumed that the user may perform additional touches while wearing the glove. The controller 403 may decrease the sensitivity of the receiver 106 and/or decrease the transmission power of the transmitter 105 when a direct touch is detected, for example, to save power.

As indicated above, FIG. 4 is provided merely as an example. Other examples are possible and may differ from what was described with regard to FIG. 4. The number and arrangement of components shown in FIG. 4 are provided as an example. In practice, the ultrasonic touch sensor 400 may include additional components, fewer components, different components, or differently arranged components than those shown in FIG. 4. Two or more components shown in FIG. 4 may be implemented within a single component, or a single component shown in FIG. 4 may be implemented as multiple, distributed components. Additionally, or alternatively, a set of components (e.g., one or more components) of the ultrasonic touch sensor 400 may perform one or more functions described as being performed by another set of components of the ultrasonic touch sensor 400. In some implementations, the ultrasonic touch sensor 400 may be configured to target any ultrasonic reflected wave for measurement that undergoes a change in response to a touch event (e.g., a direct touch event) occurrent at the touch surface 104. Such a configuration would enable the ultrasonic touch sensor 400 flexibility to accommodate different types of touch structures.

FIG. 5 illustrates a flowchart of an example process 500 associated with ultrasonic touch sensor using capacitive cross-talk for making a touch/no-touch decision. In some implementations, one or more process blocks of FIG. 5 are performed by an ultrasonic touch sensor (e.g., ultrasonic touch sensor 100, ultrasonic touch sensor 200, or ultrasonic touch sensor 400). Additionally, or alternatively, one or more process blocks of FIG. 5 may be performed by one or more components of the ultrasonic touch sensor, such as a transmitter (e.g., transmitter 105), a receiver (e.g., receiver 106), and/or a sensor circuit (e.g., sensor circuit 107).

As shown in FIG. 5, process 500 may include capacitively coupling a capacitive ultrasonic transmitter with a capacitive ultrasonic receiver by a capacitive path (block 510). For example, the ultrasonic touch sensor may capacitively couple the transmitter 105 with the receiver 106 by at least the capacitive path 201, as described above.

As further shown in FIG. 5, process 500 may include generating an excitation signal to produce an ultrasonic transmit wave directed towards a touch structure, where the excitation signal induces a capacitive cross-talk on the capacitive path (block 520). For example, the ultrasonic touch sensor (e.g., the signal generator 404) may generate an excitation signal to produce an ultrasonic transmit wave directed towards a touch structure, where the excitation signal induces a capacitive cross-talk on the capacitive path, as described above.

As further shown in FIG. 5, process 500 may include generating a measurement signal representative of the capacitive cross-talk (block 530). For example, the ultrasonic touch sensor (e.g., the measurement circuit) may generate a measurement signal representative of the capacitive cross-talk, as described above.

As further shown in FIG. 5, process 500 may include determining whether a no-touch event or a touch event has occurred at the touch structure based on whether the measurement signal satisfies a threshold (block 540). For example, the ultrasonic touch sensor (e.g., the measurement circuit) may determine whether a no-touch event or a touch event has occurred at the touch structure based on whether the measurement signal satisfies a threshold, as described above.

Process 500 may include additional implementations, such as any single implementation or any combination of implementations described below and/or in connection with one or more other processes described elsewhere herein.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The following provides an overview of some Aspects of the present disclosure:

Aspect 1: A touch sensor, comprising: a housing having an ultrasound chamber; a touch structure coupled to the housing and arranged over the ultrasound chamber, wherein the touch structure comprises a touch interface; a signal generator configured to generate an excitation signal for producing an ultrasonic transmit wave; a transmitter arranged within the ultrasound chamber, wherein the transmitter is configured to receive the excitation signal and transmit the ultrasonic transmit wave towards the touch structure based on the excitation signal; a receiver arranged within the ultrasound chamber, wherein the receiver is configured to receive an ultrasonic reflected wave produced by a reflection of the ultrasonic transmit wave at the touch structure, wherein the transmitter and the receiver are coupled by a capacitive path, wherein the receiver is configured to be influenced by the excitation signal whereby the excitation signal induces a capacitive cross-talk on the capacitive path, and wherein the receiver is configured to generate a measurement signal representative of the capacitive cross-talk; and a measurement circuit coupled to the receiver and configured to perform a comparison of the measurement signal with a threshold and determine whether a no-touch event or a touch event has occurred at the touch interface based on whether the measurement signal satisfies the threshold.

Aspect 2: The touch sensor of Aspect 1, wherein the measurement circuit is configured to detect the no-touch event when the measurement signal does not satisfy the threshold, and detect the touch event when the measurement signal satisfies the threshold.

Aspect 3: The touch sensor of any of Aspects 1-2, wherein the measurement circuit is configured to measure a function of an amplitude of the measurement signal to generate a measured value, detect the no-touch event when the measured value does not satisfy the threshold, and detect the touch event when the measured value satisfies the threshold.

Aspect 4: The touch sensor of Aspect 3, wherein the measured value is a global extremum of the measurement signal measured within a predetermined measurement interval, a maximum peak-to-peak amplitude of the measurement signal measured within the predetermined measurement interval, an average amplitude of the measurement signal measured within the predetermined measurement interval, or a median amplitude of the measurement signal measured within the predetermined measurement interval.

Aspect 5: The touch sensor of any of Aspects 1-4, wherein the measurement circuit is configured to measure a function of an amplitude of the measurement signal to generate a measured value, detect the no-touch event when a difference between the measured value and a reference value does not satisfy the threshold, and detect the touch event when the difference satisfies the threshold.

Aspect 6: The touch sensor of any of Aspects 1-5, wherein the measurement circuit is configured to calculate a distance of the measurement signal relative to a reference signal to generate a measured value, detect the no-touch event when a difference between the measured value and a reference value does not satisfy the threshold, and detect the touch event when the difference satisfies the threshold.

Aspect 7: The touch sensor of any of Aspects 1-6, wherein: the capacitive path is a first capacitive path, and the transmitter and the touch structure are configured such that a second capacitive path, which couples at least one of the transmitter or the receiver to ground, is formed during the touch event, wherein a formation of the second capacitive path is configured to cause a reduction in the capacitive cross-talk, thereby causing an amplitude of the measurement signal to decrease.

Aspect 8: The touch sensor of Aspect 7, wherein the second capacitive path is formed in series with the first capacitive path, wherein the second capacitive path includes a grounding path formed by the touch event.

Aspect 9: The touch sensor of any of Aspects 1-8, wherein: during the touch event, the transmitter, the receiver, and the touch structure are configured such that a touch made during the touch event produces a shielding effect between the transmitter and the receiver that is configured to cause a reduction in the capacitive cross-talk, thereby causing an amplitude of the measurement signal to decrease.

Aspect 10: The touch sensor of Aspect 9, wherein the touch includes a direct touch made at the touch interface or an indirect touch made at the touch interface.

Aspect 11: The touch sensor of any of Aspects 1-10, wherein: the transmitter is configured to transmit the ultrasonic transmit wave at a transmission time, the receiver is configured to be influenced by the excitation signal whereby the excitation signal induces the capacitive cross-talk on the capacitive path for a predetermined interval which begins at the transmission time and ends prior to the receiver receiving the ultrasonic reflected wave, and the measurement circuit is configured to measure the measurement signal during the predetermined interval to obtain a measured value of the measurement signal, perform a comparison of the measured value with the threshold, and determine whether the no-touch event or the touch event has occurred at the touch interface based on whether the measured value satisfies the threshold.

Aspect 12: The touch sensor of Aspect 11, wherein the measurement circuit is configured to measure a function of an amplitude of the measurement signal during the predetermined interval to generate the measured value, detect the no-touch event when the measured value does not satisfy the threshold, and detect the touch event when the measured value satisfies the threshold.

Aspect 13: The touch sensor of any of Aspects 1-12, wherein the ultrasound chamber is filled with a coupling medium that couples the transmitter and the receiver, wherein the capacitive path includes the touch structure and a path through the coupling medium.

Aspect 14: The touch sensor of any of Aspects 1-13, wherein the ultrasound chamber is filled with a coupling medium that capacitively couples the transmitter and the receiver to form the capacitive path Aspect 15: The touch sensor of any of Aspects 1-14, wherein the capacitive path includes the touch structure.

Aspect 16: The touch sensor of any of Aspects 1-15, wherein the transmitter is a first ultrasonic transducer comprising a first flexible membrane configured to generate the ultrasonic transmit wave and the receiver is a second ultrasonic transducer comprising a second flexible membrane configured to detect the ultrasonic reflected wave and the capacitive cross-talk, wherein the capacitive path capacitively couples the first flexible membrane with the second flexible membrane.

Aspect 17: The touch sensor of any of Aspects 1-16, wherein a property of the capacitive path is configured to change in response to the touch event, which causes a property of the capacitive cross-talk to change.

Aspect 18: The touch sensor of any of Aspects 1-17, wherein: the measurement signal is a first measurement signal and the threshold is a first threshold, and the measurement circuit is configured to convert the ultrasonic reflected wave into a second measurement signal, perform a comparison of the second measurement signal with a second threshold, and, on a condition that the measurement circuit determines that the touch event has occurred at the touch interface based on the first measurement signal satisfying the first threshold, determine whether a touch corresponding to the touch event is a direct touch or an indirect touch based on whether the second measurement signal satisfies the second threshold.

Aspect 19: The touch sensor of Aspect 18, wherein the measurement circuit is configured to determine that the touch corresponding to the touch event is the direct touch when the second measurement signal satisfies the second threshold and determine that the touch corresponding to the touch event is the indirect touch when the second measurement signal does not satisfy the second threshold.

Aspect 20: A touch sensor, comprising: a housing comprising a frame and a touch structure coupled to the frame to define an ultrasound chamber; a signal generator configured to generate an excitation signal for producing an ultrasonic transmit wave; a capacitive ultrasonic transmitter arranged inside the ultrasound chamber, wherein the capacitive ultrasonic transmitter is configured to receive the excitation signal and transmit the ultrasonic transmit wave towards the touch structure based on the excitation signal; a capacitive ultrasonic receiver arranged inside the ultrasound chamber, wherein the capacitive ultrasonic transmitter and the capacitive ultrasonic receiver are coupled by a capacitive path, wherein the capacitive ultrasonic receiver is configured to be influenced by the excitation signal whereby the excitation signal induces a capacitive cross-talk on the capacitive path, and wherein the capacitive ultrasonic receiver is configured to generate a measurement signal representative of the capacitive cross-talk; and a measurement circuit coupled to the capacitive ultrasonic receiver to receive the measurement signal, wherein the measurement circuit is configured to determine whether a no-touch event or a touch event has occurred at the touch structure based on whether the measurement signal satisfies a threshold.

Aspect 21: The touch sensor of Aspect 20, wherein a property of the capacitive path is configured to change in response to the touch event, which causes a property of the capacitive cross-talk to change.

Aspect 22: A method, comprising: capacitively coupling a capacitive ultrasonic transmitter with a capacitive ultrasonic receiver by a capacitive path; generating an excitation signal to produce an ultrasonic transmit wave directed towards a touch structure, where the excitation signal induces a capacitive cross-talk on the capacitive path; generating a measurement signal representative of the capacitive cross-talk; and determining whether a no-touch event or a touch event has occurred at the touch structure based on whether the measurement signal satisfies a threshold.

Aspect 23: A system configured to perform one or more operations recited in one or more of Aspects 1-22.

Aspect 24: An apparatus comprising means for performing one or more operations recited in one or more of Aspects 1-22.

Aspect 25: A non-transitory computer-readable medium storing a set of instructions, the set of instructions comprising one or more instructions that, when executed by a device, cause the device to perform one or more operations recited in one or more of Aspects 1-22.

Aspect 26: A computer program product comprising instructions or code for executing one or more operations recited in one or more of Aspects 1-22.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPLAs), programmable logic controller (PLC), or other equivalent integrated or discrete logic circuitry. Accordingly, the term "processor," as used herein refers to any of the foregoing structures or any other structure suitable for implementation of the techniques described herein.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal further information. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

Further disclosure is included in the appendix. The appendix is provided as an example only and is to be considered part of the specification. A definition, illustration, or other description in the appendix does not supersede or override similar information included in the detailed description or figures. Furthermore, a definition, illustration, or other description in the detailed description or figures does not supersede or override similar information included in the appendix. Furthermore, the appendix is not intended to limit the disclosure of possible implementations.

What is claimed is:

1. A touch sensor, comprising:
a housing having an ultrasound chamber;
a touch structure coupled to the housing and arranged over the ultrasound chamber, wherein the touch structure comprises a touch interface;
a signal generator configured to generate an excitation signal for producing an ultrasonic transmit wave;
a transmitter arranged within the ultrasound chamber, wherein the transmitter is configured to receive the excitation signal and transmit the ultrasonic transmit wave towards the touch structure based on the excitation signal;
a receiver arranged within the ultrasound chamber, wherein the receiver is configured to receive an ultrasonic reflected wave produced by a reflection of the ultrasonic transmit wave at the touch structure,
wherein the transmitter and the receiver are coupled by a capacitive path,
wherein the receiver is configured to be influenced by the excitation signal whereby the excitation signal induces a capacitive cross-talk on the capacitive path, and
wherein the receiver is configured to generate a measurement signal representative of the capacitive cross-talk; and
a measurement circuit coupled to the receiver and configured to perform a comparison of the measurement signal with a threshold and determine whether a no-touch event or a touch event has occurred at the touch interface based on whether the measurement signal satisfies the threshold.

2. The touch sensor of claim 1, wherein the measurement circuit is configured to detect the no-touch event when the measurement signal does not satisfy the threshold, and detect the touch event when the measurement signal satisfies the threshold.

3. The touch sensor of claim 1, wherein the measurement circuit is configured to measure a function of an amplitude of the measurement signal to generate a measured value, detect the no-touch event when the measured value does not satisfy the threshold, and detect the touch event when the measured value satisfies the threshold.

4. The touch sensor of claim 3, wherein the measured value is a global extremum of the measurement signal measured within a predetermined measurement interval, a maximum peak-to-peak amplitude of the measurement signal measured within the predetermined measurement interval, an average amplitude of the measurement signal measured within the predetermined measurement interval, or a median amplitude of the measurement signal measured within the predetermined measurement interval.

5. The touch sensor of claim 1, wherein the measurement circuit is configured to measure a function of an amplitude of the measurement signal to generate a measured value, detect the no-touch event when a difference between the measured value and a reference value does not satisfy the threshold, and detect the touch event when the difference satisfies the threshold.

6. The touch sensor of claim 1, wherein the measurement circuit is configured to calculate a distance of the measurement signal relative to a reference signal to generate a measured value, detect the no-touch event when a difference between the measured value and a reference value does not satisfy the threshold, and detect the touch event when the difference satisfies the threshold.

7. The touch sensor of claim 1, wherein:
the capacitive path is a first capacitive path, and
the transmitter and the touch structure are configured such that a second capacitive path, which couples at least one of the transmitter or the receiver to ground, is formed during the touch event, wherein a formation of the second capacitive path is configured to cause a reduction in the capacitive cross-talk, thereby causing an amplitude of the measurement signal to decrease.

8. The touch sensor of claim 7, wherein the second capacitive path is formed in series with the first capacitive path, wherein the second capacitive path includes a grounding path formed by the touch event.

9. The touch sensor of claim 1, wherein:
during the touch event, the transmitter, the receiver, and the touch structure are configured such that a touch made during the touch event produces a shielding effect between the transmitter and the receiver that is configured to cause a reduction in the capacitive cross-talk, thereby causing an amplitude of the measurement signal to decrease.

10. The touch sensor of claim 9, wherein the touch includes a direct touch made at the touch interface or an indirect touch made at the touch interface.

11. The touch sensor of claim 1, wherein:
the transmitter is configured to transmit the ultrasonic transmit wave at a transmission time,
the receiver is configured to be influenced by the excitation signal whereby the excitation signal induces the capacitive cross-talk on the capacitive path for a predetermined interval which begins at the transmission time and ends prior to the receiver receiving the ultrasonic reflected wave, and
the measurement circuit is configured to measure the measurement signal during the predetermined interval to obtain a measured value of the measurement signal, perform a comparison of the measured value with the threshold, and determine whether the no-touch event or the touch event has occurred at the touch interface based on whether the measured value satisfies the threshold.

12. The touch sensor of claim 11, wherein the measurement circuit is configured to measure a function of an amplitude of the measurement signal during the predetermined interval to generate the measured value, detect the no-touch event when the measured value does not satisfy the threshold, and detect the touch event when the measured value satisfies the threshold.

13. The touch sensor of claim 1, wherein the ultrasound chamber is filled with a coupling medium that couples the transmitter and the receiver, wherein the capacitive path includes the touch structure and a path through the coupling medium.

14. The touch sensor of claim 1, wherein the ultrasound chamber is filled with a coupling medium that capacitively couples the transmitter and the receiver to form the capacitive path.

15. The touch sensor of claim 1, wherein the capacitive path includes the touch structure.

16. The touch sensor of claim 1, wherein the transmitter is a first ultrasonic transducer comprising a first flexible membrane configured to generate the ultrasonic transmit wave and the receiver is a second ultrasonic transducer comprising a second flexible membrane configured to detect the ultrasonic reflected wave and the capacitive cross-talk, wherein the capacitive path capacitively couples the first flexible membrane with the second flexible membrane.

17. The touch sensor of claim 1, wherein a property of the capacitive path is configured to change in response to the touch event, which causes a property of the capacitive cross-talk to change.

18. The touch sensor of claim 1, wherein:
the measurement signal is a first measurement signal and the threshold is a first threshold, and
the measurement circuit is configured to convert the ultrasonic reflected wave into a second measurement signal, perform a comparison of the second measurement signal with a second threshold, and, on a condition that the measurement circuit determines that the touch event has occurred at the touch interface based on the first measurement signal satisfying the first threshold, determine whether a touch corresponding to the touch event is a direct touch or an indirect touch based on whether the second measurement signal satisfies the second threshold.

19. The touch sensor of claim 18, wherein the measurement circuit is configured to determine that the touch corresponding to the touch event is the direct touch when the second measurement signal satisfies the second threshold and determine that the touch corresponding to the touch event is the indirect touch when the second measurement signal does not satisfy the second threshold.

20. A touch sensor, comprising:
a housing comprising a frame and a touch structure coupled to the frame to define an ultrasound chamber;
a signal generator configured to generate an excitation signal for producing an ultrasonic transmit wave;
a capacitive ultrasonic transmitter arranged inside the ultrasound chamber, wherein the capacitive ultrasonic transmitter is configured to receive the excitation signal and transmit the ultrasonic transmit wave towards the touch structure based on the excitation signal;
a capacitive ultrasonic receiver arranged inside the ultrasound chamber,
wherein the capacitive ultrasonic transmitter and the capacitive ultrasonic receiver are coupled by a capacitive path,
wherein the capacitive ultrasonic receiver is configured to be influenced by the excitation signal whereby the excitation signal induces a capacitive cross-talk on the capacitive path, and
wherein the capacitive ultrasonic receiver is configured to generate a measurement signal representative of the capacitive cross-talk; and
a measurement circuit coupled to the capacitive ultrasonic receiver to receive the measurement signal, wherein the measurement circuit is configured to determine whether a no-touch event or a touch event has occurred at the touch structure based on whether the measurement signal satisfies a threshold.

21. The touch sensor of claim 20, wherein a property of the capacitive path is configured to change in response to the touch event, which causes a property of the capacitive cross-talk to change.

22. A method, comprising:
capacitively coupling a capacitive ultrasonic transmitter with a capacitive ultrasonic receiver by a capacitive path;
generating an excitation signal to produce an ultrasonic transmit wave directed towards a touch structure, where the excitation signal induces a capacitive cross-talk on the capacitive path;
generating a measurement signal representative of the capacitive cross-talk; and
determining whether a no-touch event or a touch event has occurred at the touch structure based on whether the measurement signal satisfies a threshold.

* * * * *